United States Patent

[11] 3,597,523

| [72] | Inventor | Kenneth E. Guritz<br>570 Emerald Harbor Drive, Sarasota, Fla. 33577 |
|---|---|---|
| [21] | Appl. No. | 11,969 |
| [45] | Patented | Aug. 3, 1971 |

[54] FLOOR-MOUNTED OUTLET BOXES
5 Claims, 3 Drawing Figs.

[52] U.S. Cl. .................................................. 174/48, 220/394
[51] Int. Cl. ............................................. H02g 3/10
[50] Field of Search ............................. 174/48, 49; 220/3.3, 3.2, 3.94

[56] References Cited
UNITED STATES PATENTS

| 2,738,892 | 3/1956 | Wiesmann | 174/48 X |
| 2,932,683 | 4/1960 | Flachbarth | 174/48 |
| 3,047,650 | 7/1962 | Reiland | 174/49 |

*Primary Examiner*—Lewis H. Myers
*Assistant Examiner*—D. A. Tone
*Attorney*—John C. Albrecht

ABSTRACT: A floor-mounted electrical or communication service outlet box which employs different threaded couplings for mounting the box over hard and soft floor surface (e.g., tile versus carpeting). Additionally, the receptacles are mounted on separate mounting plates which are securely held in place by U-shaped keepers of rectangular spring material. These arrangements facilitate the installation and removal of the receptacles.

INVENTOR
K. E. GURITZ
BY *John a Albrecht*
ATTORNEY

FLOOR-MOUNTED OUTLET BOXES

FIELD OF INVENTION

This invention relates to electrical and communication services outlet boxes and, more particularly, to an improved floor-mounted outlet box.

BACKGROUND OF INVENTION

Commercial office buildings are often subjected to frequent changes in occupancy; therefore, the costs incurred in meeting the requirements of a new occupant must be kept to a minimum.

Many types of commercial construction provide metal ducts cast within a concrete floor. Prior to the pouring of a concrete floor, such ducts are securely set in place in locations specified by an architect or engineer. Where the initial layout of offices and of equipments within those offices is well defined, vertical risers termed preset floor inserts are securely fastened to the ducts prior to pouring the concrete. Subsequent changes in office layout often require abandonment of prior outlet locations and placement of outlets in new locations. In such instances, holes are bored in the floor above the metal ducts (both electrical ducts and communication services ducts) and a similar hole is cut in the duct. This permits the placement of an afterset floor insert in the duct.

It is an object of this invention to provide a floor-mounted outlet box which can be electrically and physically securely attached to floor inserts.

It is another object of this invention to permit installation of a floor-mounted outlet box over both hard floor surfaces, such as linoleum, wood or tile and over soft floor surfaces, such as carpeting.

It is another object of this invention to facilitate the installation and replacement of electrical and communication service receptacles in a floor-mounted outlet box.

SUMMARY OF INVENTION

A floor-mounted outlet box in accordance with my invention comprises a body which has a horizontal base member threaded to accept a correspondingly threaded coupling. The coupling facilitates the attachment of a service box to a floor insert with a minimum of time and effort.

Advantageously, a coupling of a first type facilitates the accurate alignment of a service box while permitting the box to be easily drawn firmly against hard floor surfaces such as tile, wood, etc. Thus, an outlet box is held securely in place and a substantially waterproof seal is made between the floor surface and the bottom of the box. Where an absolutely waterproof seal is required, and in instances in which an installation is made over a rough floor surface, a gasket of appropriate resilient material may be placed between the floor box and the floor.

A coupling of a second type, advantageously, facilitates the installation of a service box over a soft surface, such as a carpet, without the need to remove any carpeting. Two small cuts intersecting each other to generally form an "X" is all that is required to permit installation of my service box.

Both types of coupling provide good physical and electrical connection of a service box to a floor insert.

My invention will be readily understood from the following detailed description which makes reference to the drawing in which.

DETAILED DESCRIPTION

Figure 1:
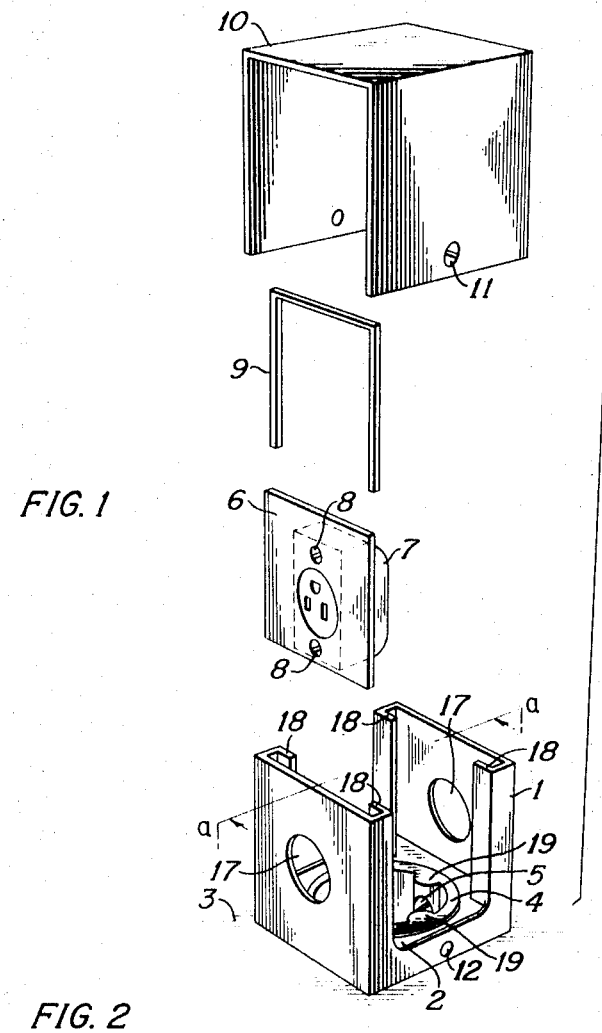
FIG. 1 is an exploded view of a floor-mounted service outlet box.

FIG. 1 illustrates a service box arranged to mount two single electrical outlets 7. Other devices, such as communication receptacles, may be similarly mounted in my service box. In the event that only one device, e.g., one electrical outlet, is to be mounted in a box then the unused mounting hole 17 is covered with a snap-in-type blank metal fitting.

As seen in FIG. 1, my service box comprises a body which comprises a wall portion 1 and a base portion 2. In one embodiment of my invention the wall portion 1 is fabricated from a length of rectangular aluminum extrusion. The extrusion has four fins 18 which are parallel to each other and which protrude equally, as shown in the drawing. The extrusion is machined to provide the apertures 17 in the two opposite walls which do not adjoin the fins 18 to receive the electrical or communication receptacles 7 and to form the openings in the two remaining walls, namely, the walls which adjoin the fins. Advantageously, the openings in these two remaining walls afford ready access to the coupling 4 and to the wiring which is connected to the mounted receptacles. Additionally, the four fins are machined equally to permit the installation of the base 2 into the bottom of the wall portion of the body. The base 2, in one illustrative embodiment of my invention, is welded to the wall portion to provide a good physical and electrical connection between these two portions of the body. The wall portion of the body also has two threaded holes 12 which receive cover plate screws 11.

The mounting plate 6 is adapted to slide in the channels formed by a pair of fins 18 and the wall which is parallel thereto and which has an opening 17 to receive an outlet 7. The mounting plate 6, with the receptacle 7 held in place by the screws 8, is dropped in place in the above described channels so that the face of the outlet 7 protrudes into the hole 17.

The U-shaped keeper 9 is made of a rectangular formed spring material which may be inserted between the back of a mounting plate 6 and the fins 18 to hold the mounting plate firmly in place. Generally, the keeper 9 will afford a good electrical connection between the mounting plate 6, the body 1, the base 2, and the coupling 4. However, if necessary, a separate grounding connection (not shown) may be made between a protective ground terminal of an electrical outlet 7 and a base member 2. After the mounting plates 6 and their keepers are securely in place, the cover 10 may be slid over the wall portion 1 to prevent accidental access to the connections in the box and to complete the external appearance of the box. The cover 10 is securely fastened to the body 1 both mechanically and electrically by screws 11.

Figure 2:
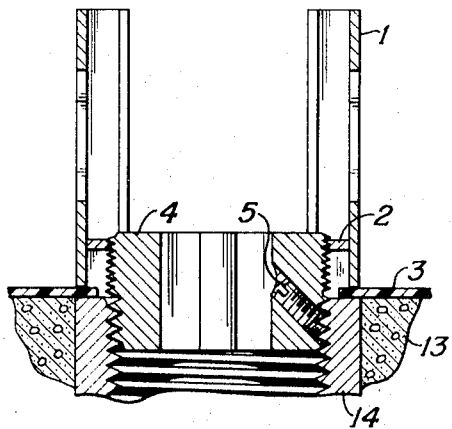
FIG. 2 illustrates the installation of a service box over a hard floor surface.

The coupling 4 illustrated in FIG. 1 is the type of coupling further illustrated in FIG. 2. As previously indicated herein, this type of coupling is employed in instances in which the box is to be mounted on a hard surfaced floor. It should be noted that the coupling 4 of FIG. 2 is threaded with a coarse thread in its lower portion and a finer thread in its upper portion. The coarse thread corresponds to the internal thread of the insert 14 to which the box is being attached. The finer thread engages the corresponding threads of the base portion 2 of the outlet box. As seen in FIG. 1, the coupling 4 is made from an aluminum extrusion which, in this one illustrative example, has four internal lugs 19. As will be described more fully herein, these lugs facilitate the installation of my outlet box.

A coupling 4 may be partially screwed into a floor insert 14 and then a body 1 may be screwed onto the upper portion of the coupling. As the bottom of the body 1 approaches the surface of the floor 3, the box is properly oriented with respect to a desk or other equipment served by the box and then a spanner wrench is employed to engage the lugs 19 to thread the coupling 4 further into the insert 14. Because of the difference of the pitches of the threads on the upper and lower portion of the coupling, the body 1 will be drawn firmly against the floor surface 3, that is, as the coupling 4 is threaded into the insert 14 its downward motion is faster than the rate at which the finer thread feeds out of the thread in the base 2. Accordingly, the body 1 is drawn against the floor 3. Although generally not necessary, a locking and grounding screw 5 is provided. This screw may be tightened against the threads of the floor insert 14 to assure that the box cannot be turned and to assure that a good ground connection exists between the floor insert 14 and the coupling 4.

Figure 3:
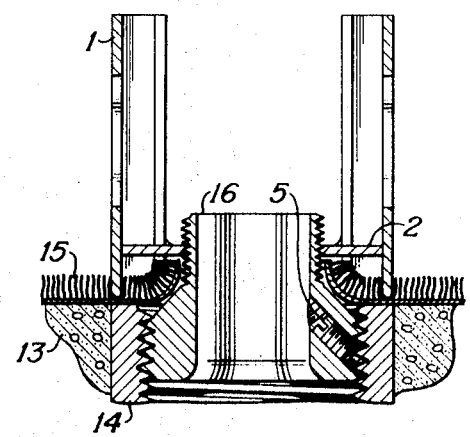
FIG. 3 illustrates the installation of a service box over a soft floor surface such as a carpet.

A service box arranged to mount over a soft floor surface, such as a carpet, is shown in FIG. 3. It should be noted that the hole in the base 2 of the body of FIG. 3 is substantially smaller in diameter than the diameter of the hole in the base 2 of FIG. 2. The internal diameter of the couplings of FIGS. 2 and 3, however, is the same. Therefore, such boxes will both serve the same number and sizes of wires. The coupling 16 of FIG. 3 is formed to have a thin wall in its upper portion. As seen in FIG. 3, this arrangement permits the carpeting to be stored under the base of the body. Accordingly, an installer merely cuts two lines intersecting to form an "X" over an existing insert or over a location at which an insert is being placed. Subsequently, the loose carpet may be raised to facilitate the installation of the coupling 16 into the floor insert 14 and then the loose carpet ends are laid against the outside wall of the coupling 16. The body is then engaged with the coupling 16 and turned until the desired orientation of the service box has been achieved. Again, a locking and grounding screw 5 is provided. When an outlet box is to be removed from an insert under a carpeted surface, the body 1 and the coupling 16 are removed. A closure (not shown) is screwed into the insert 14 and a carpet mending tape having an adhesive surface is placed under the loose ends of the carpet. The loose carpet ends, which have been previously stored under the box, are then firmly pressed against the adhesive surfaces of the carpet mending tape and there is no need to add any carpeting to cover an otherwise unsightly hole.

What I claim is:

1. A floor-mounted service box comprising: a body comprising wall means having a top edge, a bottom edge and an internal perimeter, and a substantially horizontal base member, said base member being structurally and electrically attached to said wall member at said perimeter thereof and at a small vertical distance above said bottom edge of said wall member; said base member having a threaded opening therethrough; and coupling means for passing wires therethrough and comprising a first externally threaded portion to cooperatively engage said threaded opening of said base member and a second portion adapted to engage a floor insert.

2. A floor-mounted service box in accordance with claim 1 wherein said second portion of said coupling is threaded to cooperatively engage corresponding threads in said floor insert, and wherein the pitch of said threads on said second portion of said coupling means exceeds the pitch of said threads on said first portion.

3. A floor-mounted service box in accordance with claim 1 wherein said body comprises a rectangle defined by said wall means, certain of the sides of said wall means having a passage therethrough to permit access to the face of a service device mounted in said outlet box; flat mounting means for supporting said service device; channel means in said wall means for slidably receiving said mounting means, and spring means for holding said mounting means securely in said channel means and in proper alignment with said passage in said wall means.

4. A floor-mounted service box in accordance with claim 2 wherein said coupling means comprises a metal tube having a plurality of lugs depending from the internal surface thereof and running axially with said tube, said lugs being adapted to engage a wrench for positioning said coupling means.

5. A floor-mounted service box comprising: wall means having a top edge, a bottom edge and an internal perimeter; a flat base plate with a passage therethrough; coupling means for passing wires and joined to said base plate coaxially with said passage therethrough; said base plate structurally and electrically joined to said wall means at said internal perimeter thereof and at a sufficient distance above said bottom edge thereof to provide a carpet storage chamber bounded by said coupling means, the under surface of said base plate and a portion of the internal surfaces of said wall means.